Jan. 16, 1940.   L. L. SMITH   2,187,562
APPARATUS FOR MAKING PLASTIC FORMS
Filed April 13, 1938   2 Sheets-Sheet 1

Lloyd L. Smith,
INVENTOR
BY Victor J. Evans & Co.
ATTORNEYS

WITNESS P. T. Hickey

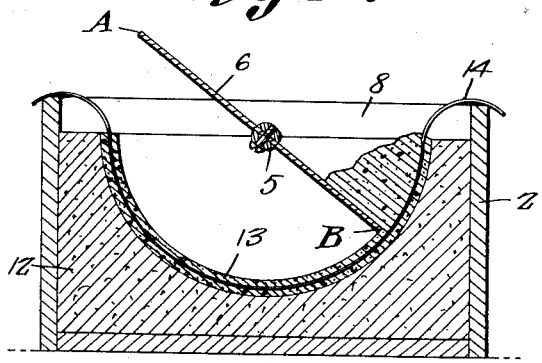
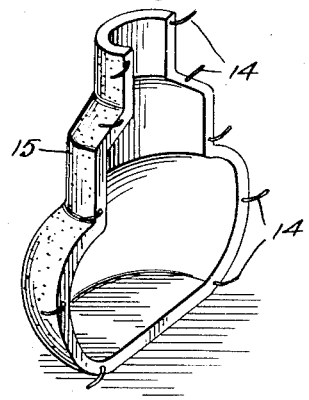
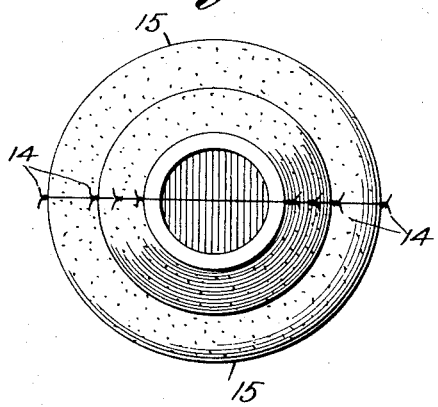
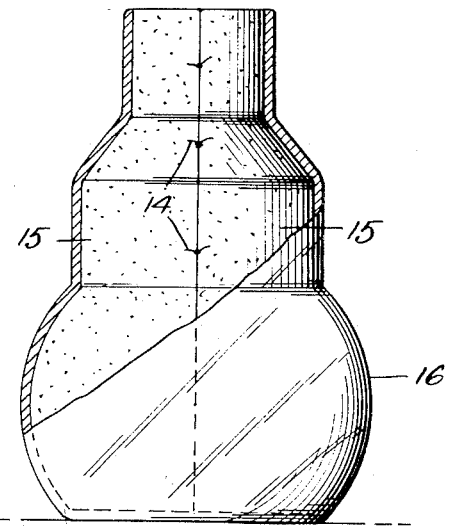

Patented Jan. 16, 1940

2,187,562

UNITED STATES PATENT OFFICE 2,187,562

APPARATUS FOR MAKING PLASTIC FORMS

Lloyd L. Smith, Minneapolis, Minn.

Application April 13, 1938, Serial No. 201,826

3 Claims. (Cl. 25—129)

This invention relates to an apparatus for more efficiently and economically making plastic articles such as various types of pottery and other architectural objects and has for the primary object the making and using of a hollow shell form of a selected design on which the plastic material is molded and which provides a permanent lining for the completed article or object eliminating the use of the usual destructible core now employed on which the plastic material is molded to a desired design.

Another object of the invention is the provision of an apparatus for molding sections into a selected design and employed in completing the shell form and embodies mold sand and a movably mounted pattern element for first shaping the mold sand to a selected design and then causing plastic material placed in the mold sand to conform to the contour of the design made therein and for removing surplus plastic material not needed and then shaping the exposed surface of the plastic material to have the selected design so that when the plastic material has hardened and been removed it will form one-half of the shell form which when joined with a like section completes the shell form on which the pottery material may be shaped to form the article or object of the selected design with the shell form remaining therein and providing a liner therefor.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a perspective view illustrating the apparatus for the molding of the shell sections.

Figure 4 is a view similar to Figure 3 showing the plastic material being shaped to the design created in the sand mold by the pattern element.

Figure 5 is a perspective view illustrating one of the completed sections of the shell form.

Figure 6 is a top plan view showing the completed shell form.

Fig. 7 is a side elevation partly in section showing the completed shell form.

Figure 1:
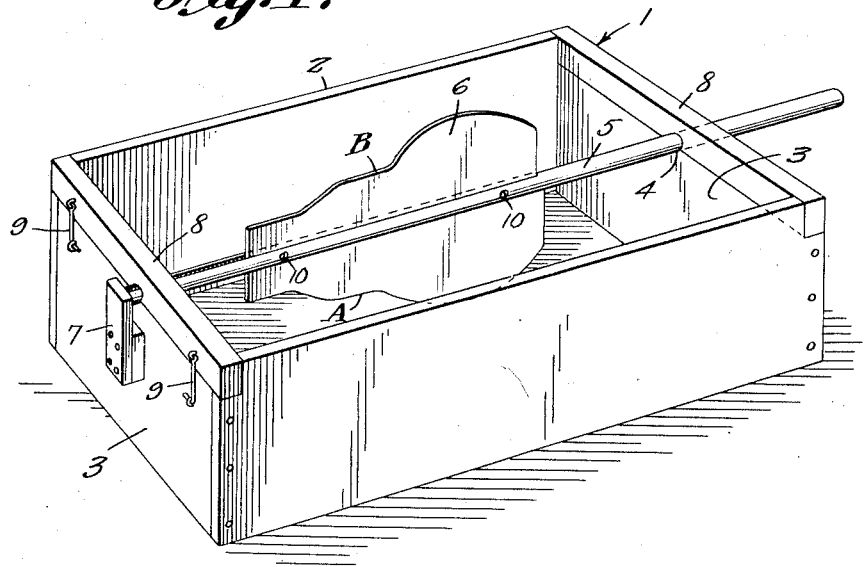
Figure 2:
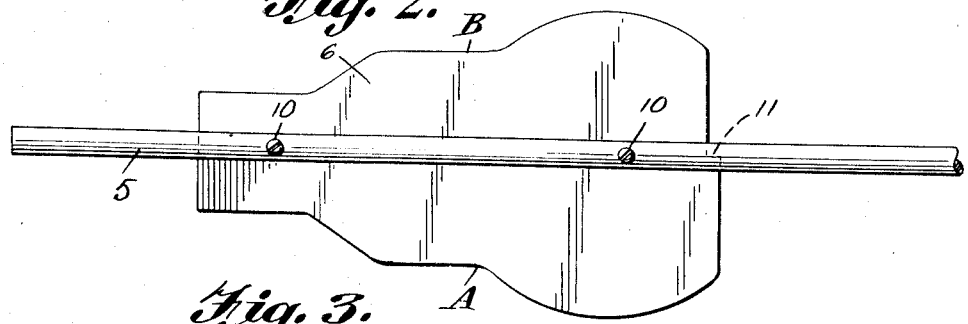
Figure 2 is a plan view showing a pattern element.
Figure 3:
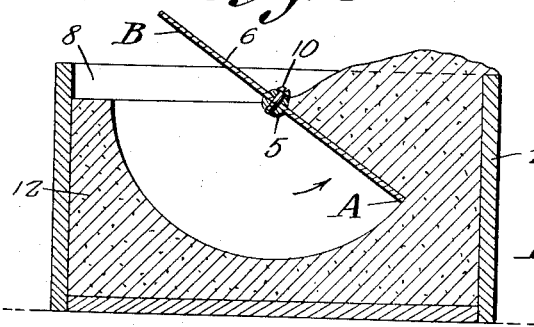
Figure 3 is a transverse view showing the mold sand being shaped to a selected design by the pattern element.

Referring in detail to the drawings, the numeral 1 indicates in entirety the apparatus less the mold sand employed in the molding of plastic material into a shell form of a selected design and consists of a box 2 of substantially rectangular shape, the end walls 3 thereof being provided with bearing openings 4 to rotatably support a shaft 5 of a pattern element 6. One end of the shaft extends well beyond the box so that it can be gripped and rotated in either direction while the other end of the shaft abuts a stop 7 mounted on one of the end walls 3 of the box. The end walls 3 include removable sections 8 so that the shaft 5 can be easily applied and removed from the box when desired. The removable sections 8 are held in place by fasteners 9. The shaft 5 is split to receive the form element, the latter being detachably secured to said shaft by screws or like fasteners 10. The pattern element is in the form of a flat plate having silhouette edges of a selected design of pottery or the like. One end edge of the pattern element is stepped or cut away, as shown at 11. Also, it is to be noted that one side edge of the pattern element is located a greater distance from the shaft than the opposite side edge. The side edge which is located the greatest distance from the shaft 5 is indicated by the character A, while the other side edge is indicated by the character B.

Moistened mold sand 12 is placed in the box 2 and the pattern element is rotated back and forth with the side edge A working in the mold sand so as to create a design in the mold sand in accordance with the edge A. After the design has been made in the mold sand plastic material is placed in the mold sand covering the design therein and the edge B of the pattern element is moved back and forth in contact with the plastic material, indicated by the character 13, causing said plastic material to conform to the design in the mold sand as well as to the edge B of the pattern element. The pattern element is oscillated or moved back and forth to such an extent that surplus plastic material will be removed from the mold sand. When the plastic material is placed in the mold sand, flexible tie elements 14 are placed therein with the ends draped over the opposite edges of the box, as shown in Figure 4. After the plastic material has hardened it is removed completing one section, as indicated at 15, of a shell form 16. Each section consists of one-half of the shell form. It will be seen by Figure 5 that the ends of the tie elements are exposed on the shell sections. A pair of said shell sections are brought together and the ends of the flexible elements of said sections are twisted or tied together, as shown in Figure 6. Also the adjoining edges of the sections are cemented together, completing the shell form on which pottery material may be placed and made to conform thereto. It is to be understood that after the pottery material has been properly treated and hardened a completed device is had with the shell form remaining therein acting as a reinforcement.

By having one end edge of the pattern element cut away or stepped, as shown at 11, will permit forming of the end wall of the shell section of the plastic material.

Thus it will be seen through the use of this apparatus shell forms can be easily and rapidly made in sections and the sections joined together to complete the shell form on which plastic material may be applied and treated to form a completed article with the shell form remaining as a part thereof.

What is claimed is:

1. An apparatus comprising a box adapted to contain mold sand, a slotted shaft detachably and rotatably journaled in the box, a plate detachably secured between opposite portions of the slotted shaft and having opposite edges of a similar design, but one of said edges being closer to the axis of rotation.

2. An apparatus comprising a box adapted to contain moistened mold sand, a shaft journaled on said box for rotation in opposite directions, and a plate secured to said shaft and extending longitudinally thereof with one longitudinal edge of the plate spaced a greater distance from the shaft than the other, the longitudinal edges of the plate being shaped to a selected design.

3. An apparatus comprising a box adapted to contain moistened mold sand, a shaft journaled on said box for rotation in opposite directions, and a plate secured to said shaft with portions disposed at opposite sides thereof, and with the longitudinal edges of the plate being shaped to a selected design, the longitudinal edge of one portion being spaced a greater distance from the shaft than the longitudinal edge of the other portion and at least one end of the second-mentioned portion being stepped inwardly from the corresponding end of the said first-mentioned portion.

LLOYD L. SMITH.